United States Patent [19]

Dotti et al.

[11] Patent Number: 4,773,452
[45] Date of Patent: Sep. 27, 1988

[54] TERMINATION OF A TUBE FOR TRANSPORTING PRESSURIZED FLUIDS

[75] Inventors: Enrico Dotti, Milan; Angelo Sala, Merate, both of Italy

[73] Assignee: Societa' Cavi Pirelli S.p.A., Milan, Italy

[21] Appl. No.: 25,400

[22] Filed: Mar. 13, 1987

[30] Foreign Application Priority Data

Mar. 28, 1986 [IT] Italy .................. 19940 A/86

[51] Int. Cl.$^4$ .................. F16L 55/12; F16L 39/02
[52] U.S. Cl. .................. 138/109; 138/127; 285/149
[58] Field of Search .......... 138/109, 124–127; 285/138, 149

[56] References Cited

U.S. PATENT DOCUMENTS

| | | | |
|---|---|---|---|
| 2,685,458 | 8/1954 | Show | 285/149 |
| 2,731,279 | 1/1956 | Main | 285/149 X |
| 2,809,056 | 10/1957 | Kaiser | 285/149 |
| 2,920,910 | 1/1960 | Schnabel | 285/149 |
| 3,318,620 | 5/1967 | Cullen et al. | 285/149 |
| 3,453,008 | 7/1969 | Lejeune | 138/109 X |
| 3,675,951 | 7/1972 | Morin | 285/149 X |
| 4,467,836 | 8/1984 | Ragout | 138/109 X |

FOREIGN PATENT DOCUMENTS

| | | | |
|---|---|---|---|
| 257158 | 4/1964 | Netherlands | 138/109 |
| 1458223 | 12/1976 | United Kingdom | 138/109 |

Primary Examiner—James E. Bryant, III
Attorney, Agent, or Firm—Brooks Haidt Haffner & Delahunty

[57] ABSTRACT

A traction resistant termination for a tube which transports fluids under high pressure, the tube having an inner tubular member of an elastomeric or plastomeric material surrounded by at least two helically wound layers of metal straps. The tubular member is received within a first hollow cylindrical body extending from a flange having an opening therethrough with which the body is coaxial. The layers of metal straps and a powder having a hardness greater than the hardness of the straps and surfaces adjacent thereto are clamped between the first body and a second hollow cylindrical body coaxial with the first body. At least one of the first and second bodies is integral with the flange. Also, a method of interconnecting the tube with such bodies.

5 Claims, 2 Drawing Sheets

TERMINATION OF A TUBE FOR TRANSPORTING PRESSURIZED FLUIDS

The present invention relates to the termination of a large diameter tube for transporting high pressure fluids as well as the method for forming said termination.

Solely by way of example, the tubes under consideration have an outer diameter of at least two inches (about 5 cm), and the internal pressure can be from 50 to 1000 atmospheres.

These flexible tubes are used for transporting liquids (such as water, crude oil, etc.) or gases (chiefly hydrocarbons), and they generally comprise a tubular body, made of a plastic (or more generically a polymeric) material, having appropriate dimensions and two or more surrounding layers of elongated metallic bodies, with at least two opposite flat (or substantially flat) surfaces, wound helically around the tubular plastic body for enabling the contact, between said surfaces and the adjacent surface of the tube, to take place on one extended surface. For simplicity sake, the elongated metallic bodies will be referred to hereinafter by the term 'metal straps'.

One of the functions carried out by the metal straps is the reinforcing in the radial sense, and holding of the inner tubular body, made of plastic, which is subjected to the high pressure of the fluid which is transported.

Another function of the metal straps is to act as a traction-resistant element for the tube and to render the tube able to support longitudinal stresses, during the laying operation for example.

The metal strap layers are usually two in number, one helically wound over the other with a relatively long pitch and in the opposite hands. However, the tube could have a greater number of metal strap layers. For example, there can be an inner layer formed by two adjacent metal straps, wound in a short pitch helix, whereby the function of radial reinforcement is predominant, and two outer layers, wound with a long pitch, whereby the function of traction resistance is predominant.

In the tube, there can also be present other elements, such as a taping between the inner metal strap layer and the tubular plastic body for thus enabling a distribution of forces and avoiding any "extrusion" phenomena of plastic material into the inter-spaces between two adjacent metal straps, plastic layer coverings, outer layers made of jute, etc., which, for the purpose of the present invention, are not relevant and will, therefore, not be taken into account in the description of the invention.

For connecting a tube length to an apparatus, or else, to another tube length, the tube extremities are terminated with suitable flanges which are connected to one another or to corresponding flanges on the apparatus.

The said flanges must not only guarantee the sealing, but also a stable engagement with the metal straps which requires that the metal straps be spaced apart at the terminal length of the tube and then, be secured to the cylindrical parts of the flange.

In one known termination, the metal straps are folded backwards and then welded around an annular metallic body placed in a cavity (also annular) of the flange, which is thereupon filled up with a resinous material which, on hardening, further secures said metal straps to the flange.

In another known termination, the metal straps are spaced apart, but instead of being folded back, they are shaped in such a way as to present a certain number of directional changes in the annular resin-filled cavity, for thus increasing the grip of the resin on the metal straps.

The main drawbacks of these known terminations are those which result from requiring operations on the metal straps for modifying their shape, and from the very long period of time which is required for their manufacture, primarily due to the need for allowing the resin to completely harden. Moreover, although these terminations are generally found to be quite satisfactory with respect to their tightness, they require flanges of a complex construction.

Therefore, one object of the present invention is to provide a termination which has a high mechanical resistance and which is, at the same time, rapidly and simply constructed.

In accordance with the invention, a termination of a tube adapted for transporting pressurized fluids and comprising a central tubular body of an elastomeric, or plastomeric material and at least two layers of metal straps which are wound helicoidally around said central tubular body, comprises a flange having a cylindrical portion and an annular body, said termination being characterized by the fact that the terminal tract of the said metal straps is clamped between the cylindrical portion and the annular body of the flange with the interpositioning of a layer of powders having a high hardness between the surfaces of said metal which contact with the flange.

Also, in accordance with the invention, there is provided a method for fastening a flange, which comprises a cylindrical portion and an annular body, at the extremity of a tube for transporting fluids under pressure, comprising a central tubular body of an elastomeric, or a plastomeric material, and at least two layers of metal straps wound helicoidally around the central tubular body, said method being characterized by the fact of radially spacing apart these metal straps from the central tubular body, for a tract adjacent to its extremity, and of engaging the spaced-apart tract of metal straps by clamping it between the said cylindrical portion and the annular body of the flange with the interpostioning of a layer of high hardness powders between the surfaces of the metal straps which contact with the flange.

Other objects and advantages of the present invention will be apparent from the following detailed description of the presently preferred embodiments thereof, which description should be considered in conjunction with the accompanying drawings in which:

FIG. 1 illustrates a longitudinal cross-section of a termination for a tube 1 which is used for transporting fluids under high pressure.

Figure 1:
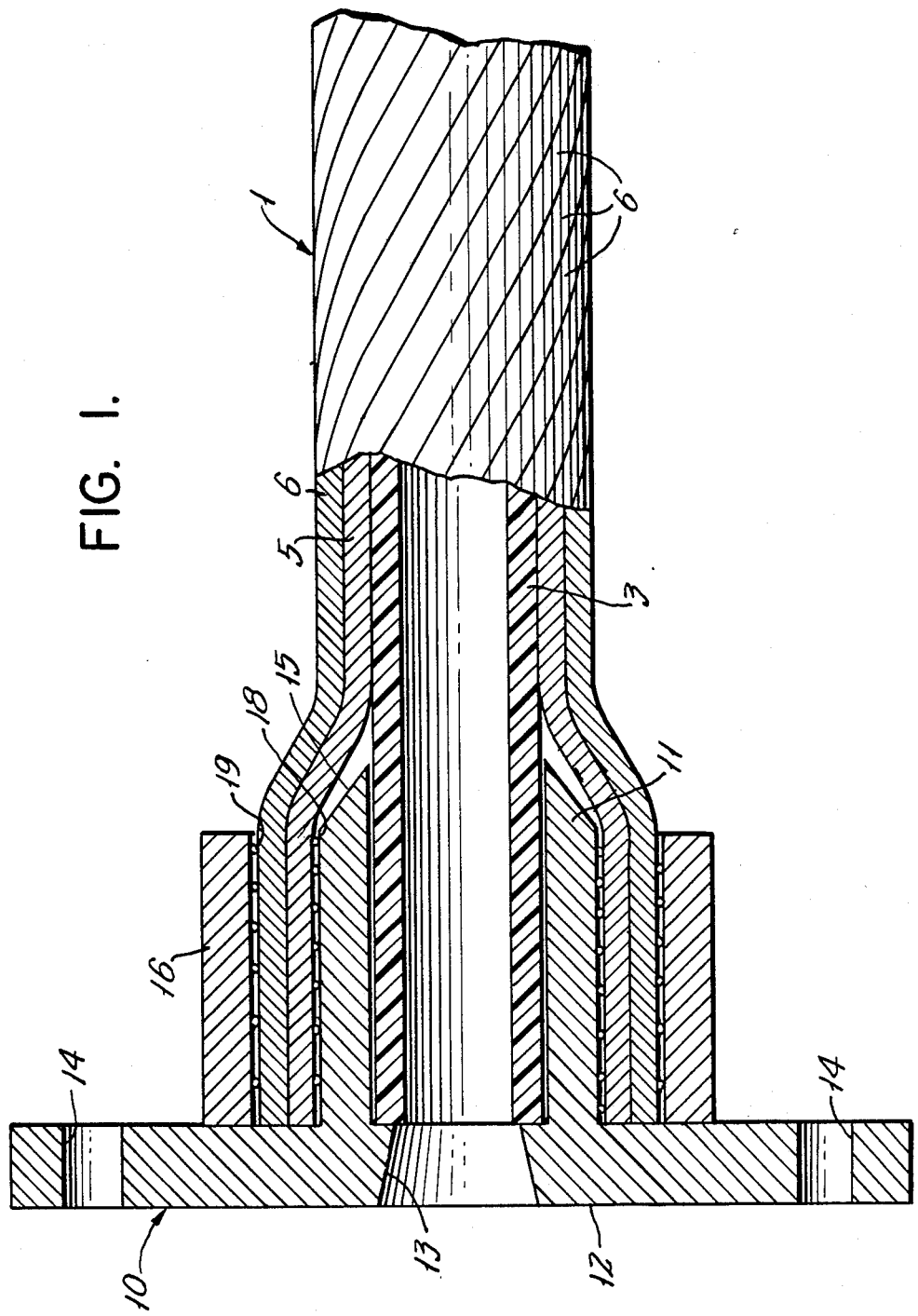
FIG. 1 is a longitudinal section of a termination of one embodiment according to the invention.

The tube 1 comprises a central, tubular, plastic body 3 (of nylon, for example) which assures the non-leakage of the fluid transported inside it, and two layers of metal straps 5 and 6 made of a high tension steel wound according to oppositely wound helixes which constitutes the elements for the traction resistance and the radial reinforcement of the central tube 3.

More generally, the central tubular body 3 is formed by an elastomeric or plastomeric material, depending upon the requirements of use. The two layers of metal straps are made from a high tension steel, e.g. of the type having an ultimate tensile stress on the order of 120-140 Kg/mm² (these values, however, being merely illustrative).

The tube is terminated with a flange 10, formed by a circular slab 12, provided with a central hole 13, and by a cylindrical portion 11 which is perpendicular to the slab 12 and integral therewith and which has a tapered portion 15. The cylindrical portion 11 has an inner diameter which is substantially equal to the outer diameter of the central tube 3.

The illustrated slab 12 is provided with a plurality of peripherally spaced holes 14 for the conventional clamping screws, but it could also have a different means for securing it to another slab. Moreover, the termination comprises an annular body, ring or collar 16 whose inner diameter is greater than the outer diameter of the straps 6.

In the termination shown in FIG. 1, the cylindrical portion 11 is integral with the slab 10 in any conventional manner, such as by being formed therewith or by welding it thereto, and the metal straps (5 and 6) are clamped in-between the cylindrical portion 11 and the annular body 16 with two layers of high hardness powders 18 and 19, respectively interposed in-between the outer surface of the cylindrical portion 11 and the layer 5 of the metal straps (inner surface) and in-between the inner surface of the annular body 16 and the layer 6 of the metal straps (outer surface).

An annular layer of such powders can also be between the contacting surfaces of the two layers of metal straps 5 and 6.

The powders 18 and 19 have a high hardness with respect to the materials forming the metal straps 5 and 6, the portion 11 and the body 16, and in particular, when measuring the hardness in Vickers degrees (HV), the powders should have a hardness of at least 100 points higher than that of the material forming the metal straps 5 and 6, the cylindrical portion 11 and the annular body 16. Said metal straps 5 and 6, by way of example, can be of steel having a hardness in the order of 120-440 HV.

The dimensions of the powders 18 and 19 measured according to the Standard UNI 7610, preferably have a particle number within the range of from 20 to 100. Advantageously, these said powders could be abrasive powders, such as carborundum, silicon carbide, etc.

The method, according to the invention, for fastening the flange 10 to the tube 1, comprises the following operations.

First, the annular body or ring 16 is inserted over the tube 1 and made to slide axially away from the end of the tube 1. Then, the metal straps (5 and 6) are lifted from the central tubular body 3 until they form an annular space in-between the inner layer 5 of metal straps and the central tubular body 3. Upon the outer surface of the cylindrical portion 11 of the flange and upon the outer surface of the layer 6, there is disposed an abrasive powder (for example, carborundum), having a hardness greater than the hardness of the cylindrical body 11, the annular body 16 and the metal straps 5 and 6.

Preferably, said powder 18 and 19 is mixed with a viscous substance, such as a grease or resin which is spread over the surfaces concerned in such a way as to allow it to be distributed uniformly and preventing the powder from falling off. As an alternative, a viscous substance can be spread over the surfaces and the powder then deposited on such substance.

The cylindrical portion 11 is then inserted into the metal straps 5 and 6 until the flange 10 abuts the central tubular body 3. Thereafter, the ring 16 is moved in the direction of the tube extremity until it abuts the slab 12 of the flange 10.

Thereafter, the ring 16 is pressed radially by known means, for example, a press, in such a way as to squeeze the ring 16 around the two metal strap layers 5 and 6. During said squeezing down action, the particles of the powders 18 and 19, having a higher hardness than that of the ring 16, of the cylindrical portion 11 and of the metal straps 5 and 6, exercise a compressing action upon these component parts and penetrate into them just as if they were microscopic blocks causing them to be made fast with the metal straps 5 and 6, the annular body 16, and the cylindrical body 11.

Figure 2:
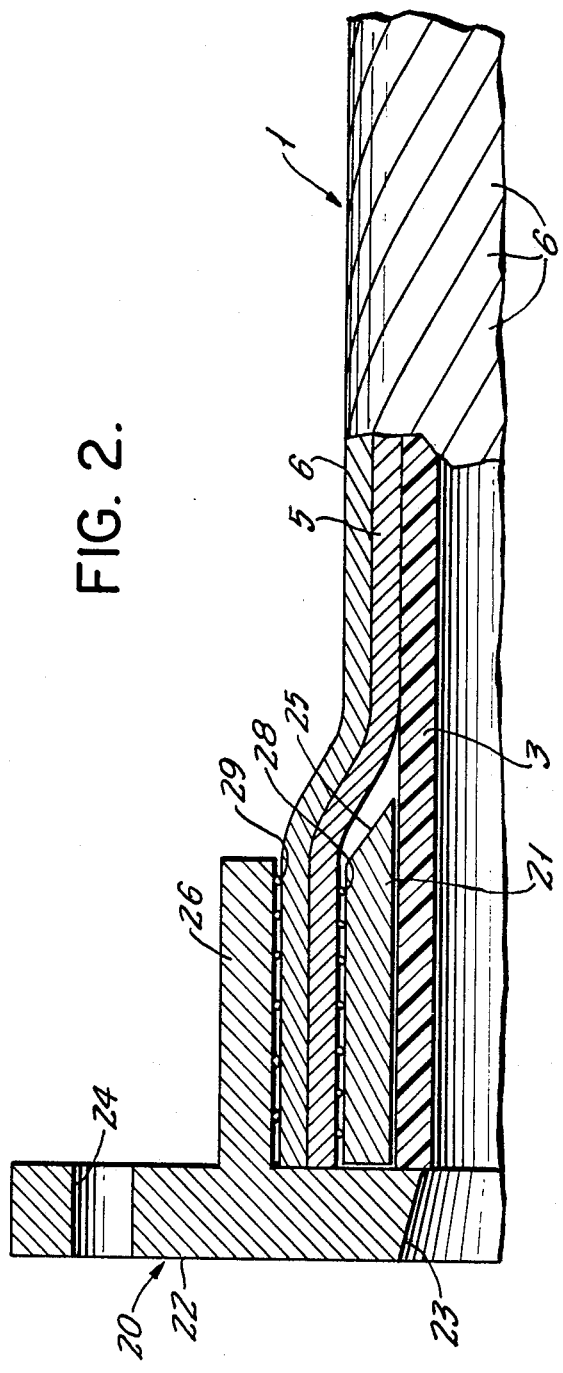
FIG. 2 is a longitudinal half-section of an alternative embodiment of the termination, according to the invention, which utilizes a different flange.

In the termination shown in FIG. 2, the tube 1 is the same as the tube shown in FIG. 1 and hence, the same reference numbers have been used for such tube in both the said Figures. The embodiment in FIG. 2 differs from the embodiment in FIG. 1 in that the outer ring or collar is integral with the termination slab and the inner cylindrical member is not.

The termination shown in FIG. 2 has a flange 20 which comprises a slab 22 provided with a central hole 23 and with peripheral holes 24 for the fastening of the slab 22 to another flange.

In the embodiment in FIG. 2, the outermost annular body 26 is integral with the slab 22 whereas the inner cylindrical portion 21, provided with a tapered extremity 25, is ring-shaped. The layers 28 and 29, of powders are interposed between the said ring 21 and the metal straps 5, and between the metal straps 6 and the annular body 26, respectively. Such powders can even be present between the metal straps 5 and 6.

The method for realizing the termination is substantially identical to the one already described with reference to the termination in FIG. 1, the only difference arising from the fact that the cylindrical portion 21, which now is a ring, is inserted over the tubular body 3 subsequent to the lifting of the metal straps 5 and 6.

Figure 3:
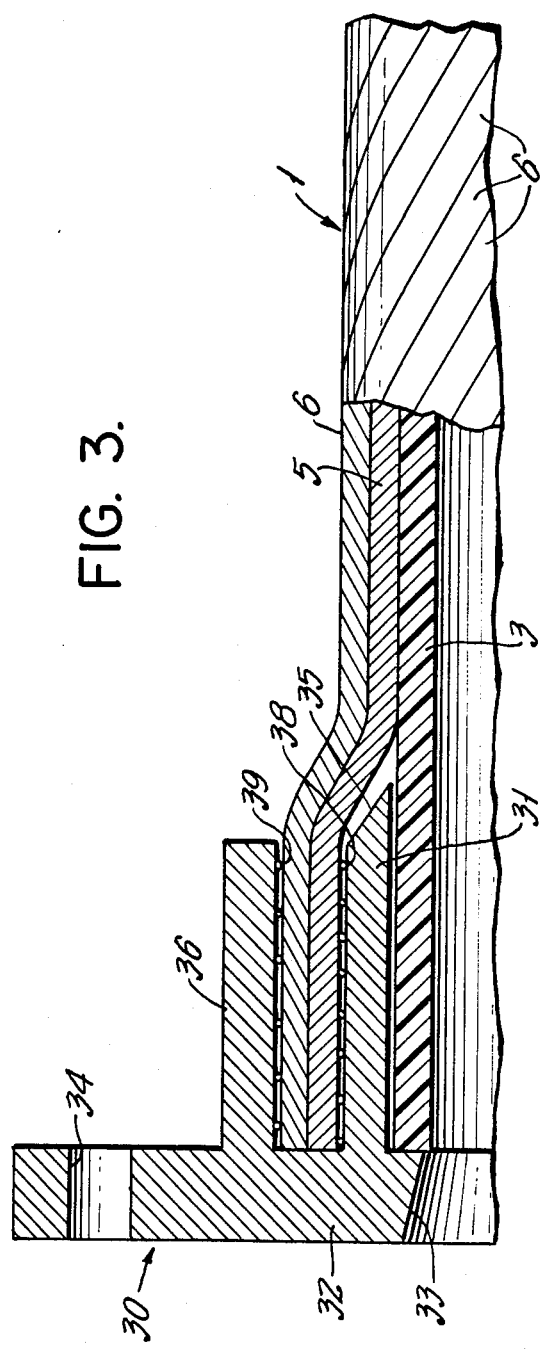
FIG. 3 is a longitudinal half-section of a further embodiment of a termination, according to the invention.

FIG. 3 illustrates a further embodiment for a termination applied to a tube 1, similar to the tubes previously illustrated, where the annular body 36 and the cylindrical portion 31 are integral with the slab 32. As previously described, the body 36 may be compressed to complete the joint, or if desired, the body 36 and the cylindrical portion 31 may be provided with threads for gripping the straps 5 and 6. The layers of powders 38 and 39 are interposed between the surfaces of the metal straps 5 and 6 and the surfaces of the annular body 36, and the cylindrical portion 31, the latter having a tapered portion 35. Such powders can even be interposed between the two layers of metal straps 5 and 6.

The slab 32 having the central hole 33 and the peripherical holes 34 is analogous to the slabs of the previous examples.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follow:

1. A termination at the end of a tube for transporting fluids under high pressure, said tube comprising an inner tubular member formed of a material selected from elastomeric and plastomeric materials surrounded by at least two layers of helically wound metal straps, said termination comprising:
- a flange having at least a central opening therethrough and at least one hollow cylindrical body extending therefrom and coaxial with said opening;
- an annular body coaxial with and having a surface spaced from said hollow cylindrical body;
- at least one said hollow cylindrical body and said annular body being secured to said flange;
- said tubular member being within the inner one of said hollow cylindrical body and said annular body and said two layers of helically wound metal straps being intermediate said hollow cylindrical body and said annular body and clamped therebetween with one of said hollow cylindrical body and said annular body therearound and the other of said hollow cylindrical body and said annular body therewithin; and
- layers of a powder having a hardness greater than the hardness of said metal straps, said hollow cylindrical body and said annular body, respectively, between and penetrating into the outer layer of said metal straps and the body therearound and between and penetrating into the inner layer of said metal straps and the body therewithin.

2. A termination as set forth in claim 1 wherein said powder has a Vicker's hardness at least 100 points greater than the hardness of the materials of said metal straps, said hollow cylindrical body and said annular body.

3. A termination as set forth in claim 1 wherein both said hollow cylindrical body and said annular body are integral with said flange.

4. A termination as set forth in claim 1 wherein said hollow cylindrical body is integral with said flange, is within said annular body that is a ring separable from said flange.

5. A termination as set forth in claim 1 wherein said hollow cylindrical body surrounds said annular body and is a ring separable from said flange and wherein said annular body is integral with said flange.

* * * * *